United States Patent
Marcondes et al.

(10) Patent No.: US 7,701,856 B2
(45) Date of Patent: Apr. 20, 2010

(54) METHOD AND SYSTEM FOR BI-LEVEL CONGESTION CONTROL FOR MULTIPATH TRANSPORT

(75) Inventors: Cesar A. C. Marcondes, Los Angeles, CA (US); Anders D. Persson, San Mateo, CA (US); Darrin P. Johnson, Mountain View, CA (US)

(73) Assignee: Oracle America, Inc., Redwood Shores, CA (US)

(*) Notice: Subject to any disclaimer, the term of this patent is extended or adjusted under 35 U.S.C. 154(b) by 644 days.

(21) Appl. No.: 11/638,904

(22) Filed: Dec. 14, 2006

(65) Prior Publication Data

US 2008/0144504 A1 Jun. 19, 2008

(51) Int. Cl.
*H04J 1/16* (2006.01)
(52) U.S. Cl. .................. 370/235; 370/252; 370/465
(58) Field of Classification Search .............. 370/230, 370/230.1, 231, 232, 233, 234, 235, 237, 370/238, 238.1, 225, 228, 465, 466
See application file for complete search history.

(56) References Cited

U.S. PATENT DOCUMENTS

| | | | | |
|---|---|---|---|---|
| 6,571,272 | B1* | 5/2003 | Ferguson et al. | 709/200 |
| 6,714,541 | B1* | 3/2004 | Iyer et al. | 370/392 |
| 6,791,979 | B1* | 9/2004 | Berl et al. | 370/389 |
| 7,474,616 | B2* | 1/2009 | Connor | 370/230.1 |
| 7,554,917 | B1* | 6/2009 | Tieu | 370/235 |
| 2005/0058131 | A1* | 3/2005 | Samuels et al. | 370/389 |
| 2005/0135250 | A1* | 6/2005 | Singh et al. | 370/235 |
| 2006/0002424 | A1* | 1/2006 | Gadde | 370/469 |
| 2006/0182025 | A1* | 8/2006 | Kim et al. | 370/229 |
| 2007/0112962 | A1* | 5/2007 | Lewontin | 709/227 |
| 2009/0129398 | A1* | 5/2009 | Riegel et al. | 370/401 |

OTHER PUBLICATIONS

Hacker, T.J. et al.; "The End-to-End Performance Effects of Parallel TCP Sockets on a Lossy Wide-Area Network", Proceedings of the 16th International Parallel and Distributed Processing Symposium, University of Michigan, IEEE, 2002, 10 pages.
Hacker, T.J. et al.; "Improving Throughput and Maintaining Fairness using Parallel TCP", IEEE Infocom 2004, Mar. 7-11, 2004; pp. 2480-2489; 10 pages.

* cited by examiner

*Primary Examiner*—Chi H. Pham
*Assistant Examiner*—Kevin Mew
(74) *Attorney, Agent, or Firm*—Osha • Liang LLP

(57) ABSTRACT

A method for managing a network connection includes establishing the network connection between an application and a packet destination, wherein the network connection comprises a plurality of paths, receiving a plurality of packets from the application on the network connection, wherein the plurality of packets is associated with the network connection, and wherein the plurality of packets comprises data from the application, obtaining a distribution of the plurality of packets among the plurality of paths by a master transport protocol module, wherein each of the plurality of paths is associated with one of a plurality of transport protocol modules, and transmitting, based on the distribution, the plurality of packets over the plurality of paths using the plurality of transport protocol modules, wherein each of the plurality of transport protocol modules implements one of a plurality of congestion control algorithms, wherein the plurality of packets are received at the packet destination.

16 Claims, 4 Drawing Sheets

METHOD AND SYSTEM FOR BI-LEVEL CONGESTION CONTROL FOR MULTIPATH TRANSPORT

CROSS-REFERENCE TO RELATED APPLICATIONS

Subject matter contained herein may be related to subject matter contained in copending U.S. patent application Ser. No. 11/639,042 entitled: "Method and System for Using Bayesian Network Inference for Selection of Transport Protocol Algorithm".

BACKGROUND

In the last several years, the Internet has evolved towards widespread sharing of all forms of information. The ease of creating a public website has led to a culture of individual self-publishing and co-operative publishing in the form of blogs, podcasts, wikis, and photo and video sharing. Voice Over Internet Protocol (VoIP) services have allowed the expansion of the Internet's communication capabilities. Sophisticated on-demand content provisioning has enabled the delivery of all forms of media across the Internet, including traditional media forms such as newspapers, radio, television, and movies. Greater bandwidth has moved traditionally local file backups and mirrors to locations that are accessed over a network. In addition, the Internet's peer-to-peer infrastructure has given rise to real-time data transmission as well as file sharing.

These changes have led to increased heterogeneity of media types and traffic, increased network complexity, reduced latency requirements, and increased bandwidth requirements. Often, network traffic seamlessly transitions through multiple wireless Local Area Network (LAN) standards (e.g., 802.11a, 802.11b, 802.11g, 802.11n), wireless Personal Area Network (PAN) standards such as Bluetooth® (Bluetooth is a registered trademark of Bluetooth Sig, Inc. of Delaware), wired standards such as Ethernet, and even storage area networks (SANs) and any associated network storage protocols. Furthermore, network traffic itself is composed of many different types of data, which are sent using various packet transmission patterns and protocols. For example, streaming video traffic is transmitted using a different protocol from VoIP traffic. Additionally, network applications, from weather simulations and telemetry to streaming media and VoIP, are demanding increased bandwidth and reduced latency from the Internet.

To operate in a heterogeneous, complex environment and meet bandwidth and latency requirements, a network connection is customized to handle different traffic patterns, types of data transmitted, and types of transmission media. However, before customization takes place, the network connection is characterized appropriately. For example, multiple Transmission Control Protocol (TCP) congestion control algorithms exist, with each algorithm designed to handle a particular set of network conditions. However, to effectively use a particular TCP congestion control algorithm, the network conditions are first determined, and the appropriate congestion control algorithm is selected for the established network conditions. Mechanisms are also put in place to deal with changing network conditions, traffic patterns, and network usage once the TCP congestion control algorithm is implemented.

SUMMARY

In general, in one aspect, the invention relates to a method for managing a network connection, comprising establishing the network connection between an application and a packet destination, wherein the network connection comprises a plurality of paths, receiving a plurality of packets from the application on the network connection, wherein the plurality of packets is associated with the network connection, and wherein the plurality of packets comprises data from the application, obtaining a distribution of the plurality of packets among the plurality of paths by a master transport protocol module, wherein each of the plurality of paths is associated with one of a plurality of transport protocol modules, and transmitting, based on the distribution, the plurality of packets over the plurality of paths using the plurality of transport protocol modules, wherein each of the plurality of transport protocol modules implements one of a plurality of congestion control algorithms, wherein the plurality of packets are received and reassembled at the packet destination.

In general, in one aspect, the invention relates to a system, comprising an application configured to transmit a plurality of packets, wherein the plurality of packets comprises data from the application, a plurality of transport protocol modules, wherein each of the plurality of transport protocol modules implements one of a plurality of congestion control algorithms, and a master transport protocol module configured to manage a network connection, wherein the network connection comprises a plurality of paths, wherein the system is configured to establish a network connection between the application and a packet destination, wherein the network connection comprises the plurality of paths, receive the plurality of packets from the application on the network connection, wherein the plurality of packets is associated with the network connection, obtaining a distribution of the plurality of packets among the plurality of paths by the master transport protocol module, wherein each of the plurality of paths is associated with one of the plurality of transport protocol modules, and transmitting, based on the distribution, the plurality of packets over the plurality of paths using the plurality of transport protocol modules, wherein the plurality of packets are received and reassembled at the packet destination.

In general, in one aspect, the invention relates to a computer readable medium containing software instructions for executing a method for managing a network connection, the method comprising establishing the network connection between an application and a packet destination, wherein the network connection comprises a plurality of paths, receiving a plurality of packets from the application on the network connection, wherein the plurality of packets is associated with the network connection, and wherein the plurality of packets comprises data from the application, obtaining a distribution of the plurality of packets among the plurality of paths by a master transport protocol module, wherein each of the plurality of paths is associated with one of a plurality of transport protocol modules, and transmitting, based on the distribution, the plurality of packets over the plurality of paths using the plurality of transport protocol modules, wherein each of the plurality of transport protocol modules implements one of a plurality of congestion control algorithms, wherein the plurality of packets are received and reassembled at the packet destination.

Other aspects of the invention will be apparent from the following description and the appended claims.

DETAILED DESCRIPTION

Figure 1:
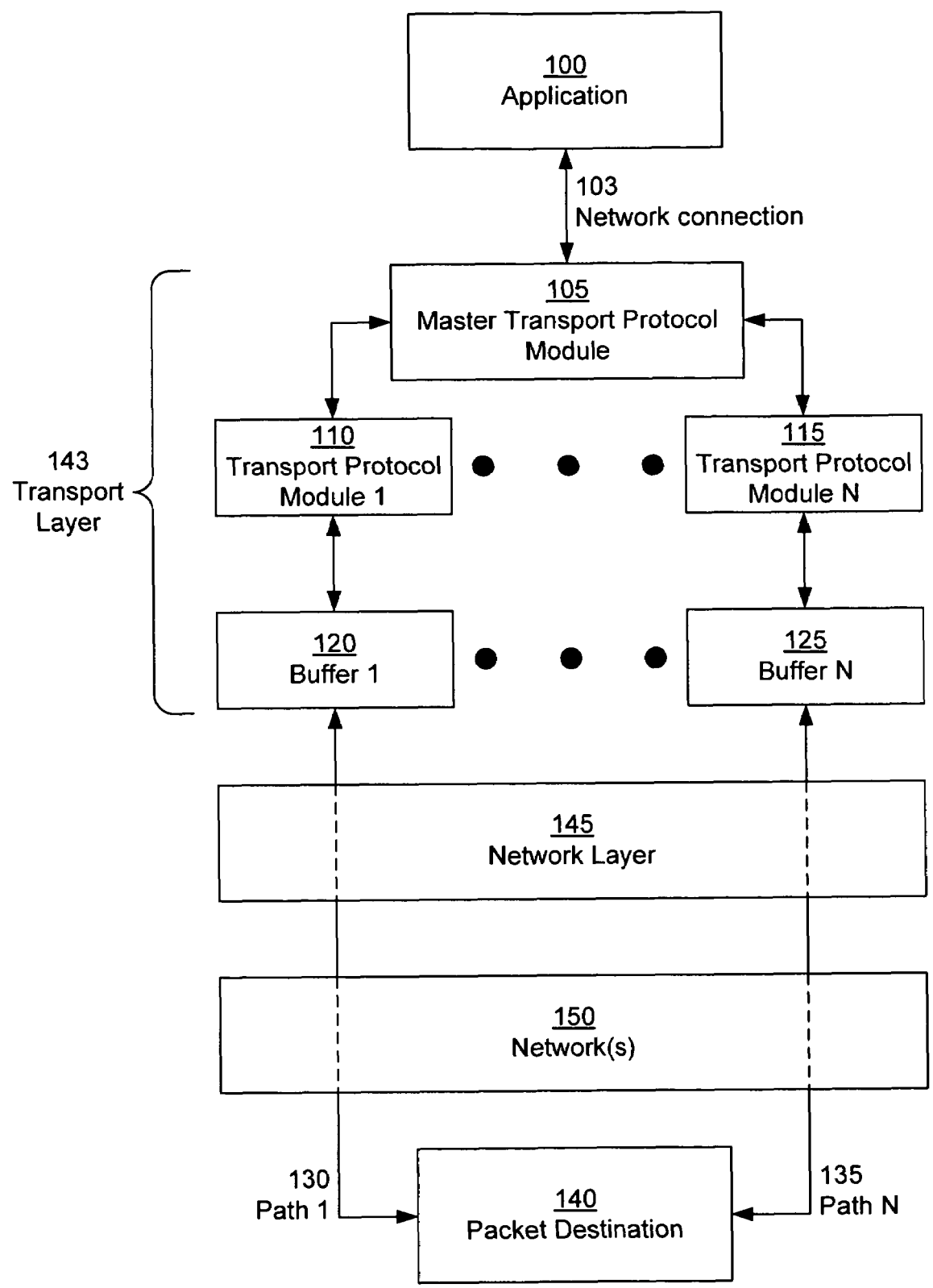
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for controlling network traffic. In one embodiment of the invention, network traffic includes packets sent over a network connection, which is established between a packet source (e.g., an application) and a packet destination. In one embodiment of the invention, the network connection includes one or more wired connections, wireless connections, or satellite connections. Further, packets communicated between the packet source to the destination may travel over one or more paths, or one or more aggregated paths. In addition, a certain path may be used to transmit packets by routing packets at various network nodes between the source and the destination.

More specifically, embodiments of the invention provide a method and system for controlling network traffic over a network connection, where there are multiple paths between an application to a packet destination. For each path, a separate congestion control algorithm may be selected based on the characteristics of the path. In one embodiment of the invention, the congestion control algorithm is implemented in a transport protocol module that is responsible for regulating packet flow along that path. In addition, in one embodiment of the invention, a master transport protocol module monitors the network connection and regulates the various transport protocol modules assigned to each path. Further, in one embodiment of the invention, if multihoming is implemented in the packet destination, packets may be transmitted simultaneously over multiple paths to the packet destination to increase the total bandwidth used over the network connection. Embodiments of the invention may also be used to increase the reliability of packet transmission over a network connection.

FIG. 1 shows a schematic diagram of a system in accordance with one or more embodiments of the invention. As shown in FIG. 1, the system includes an application (100), a network connection (103), a transport layer (143), a network layer (145), one or more networks (150), a master transport protocol module (105), multiple transport protocol modules (e.g., transport protocol module 1 (110), transport protocol module n (115)), multiple buffers (e.g., buffer 1 (120), buffer n (125)), multiple paths (e.g., path 1 (130), path n (135)), and a packet destination (140). Each of these components is described in further detail below.

In one embodiment of the invention, the application (100) includes functionality to access (and, optionally establish) a network connection (103). For example, the application (100) may be a web browser, email client, File Transfer Protocol (FTP) application, Voice Over Internet Protocol (VoIP) application, etc. In one or more embodiments of the invention, the application (100) sends packets over the network connection (103) to a packet destination (140). In one or more embodiments of the invention, the packets allow the application (100) to communicate with the packet destination (140) through the network connection (103). In one embodiment of the invention, the network connection (103) is made over one or more networks (150), such as a local area networks (LAN), a wide area network (WAN), a campus area network (CAN), a metropolitan area network (MAN), a home area networks (HAN), and/or a wireless network. Examples of applications (100) include, but are not limited to, Voice Over Internet Protocol (VoIP) applications, streaming video applications, peer-to-peer applications, File Transfer Protocol (FTP) applications, and web browsers.

In one embodiment of the invention, the packets from the application (100) pass through a transport layer (143) and a network layer (145) before being transmitted to the packet destination (140) via one or more networks (150). In one or more embodiments of the invention, the transport layer (143) and network layer (145) correspond to layers of a network stack (not shown). In one or more embodiments of the invention, a network stack corresponds to a software implementation of a computer networking protocol suite. In other words, a network stack includes mechanisms implemented in software for allowing communication between computer systems. In one or more embodiments of the invention, the transport layer (143) and network layer (145) are each associated with one or more protocols to facilitate the transmission of information between the application (100) and the packet destination (140) via one or more networks (150). In one or more embodiments of the invention, the packet destination (140) refers to a computer on the network(s) (150), or an application on the computer.

In one embodiment of the invention, the transport layer (143) provides transparent transfer of data between the application (100) and the packet destination (140). The transport layer (143) may also be responsible for end-to-end error recovery, flow control, and ensuring complete and cost-effective data transfer. Services provided by the transport layer may include, but are not limited to, creating a connection between the application (100) and packet destination (140), guaranteeing same order delivery of packets, providing a checksum of packet contents, regulating packet flow between the application (100) and packet destination (140), and providing one or more ports for the application (100). In one or more embodiments of the invention, ports are used to distinguish network traffic bound for the application (100) from network traffic bound for other applications (not shown) on the system. Protocols associated with the transport layer (143) include, but are not limited to, Transmission Control Protocol (TCP), User Datagram Protocol (UDP), Datagram Congestion Control Protocol (DCCP), and Stream Control Transmission Protocol (SCTP).

In one embodiment of the invention, the network layer (145) is responsible for end-to-end transmission of data between the application (100) and packet destination (130). In one or more embodiments of the invention, the network layer (145) provides functional and procedural means for transferring variable-length data sequences from the application (100) to the packet destination (140) via one or more networks (150). In one or more embodiments of the invention, the network layer (145) performs network routing, flow control, network segmentation and desegmentation, and error control functions. Protocols associated with the network layer (145) include, but are not limited to, Internet Protocol (IP), Address Resolution Protocol (ARP), and Datagram Delivery Protocol (DDP).

As shown in FIG. 1, the network connection (103) includes multiple paths (e.g., path 1 (130), path n (135)). In one or more embodiments of the invention, packets are sent from the application (100) through one or more routers (not shown) to reach the packet destination (140). In one or more embodiments of the invention, multiple paths (e.g., path 1 (130), path n (135)) for the network connection (103) exist if the packets may be routed in more than one way to the packet destination (140). For example, if the application (100) is connected to two Internet Service Providers (ISPs), packets may be sent to the packet destination (140) via either ISP. As a result, each ISP provides a path (e.g., path 1 (130), path n (135)) to the packet destination (140). Those skilled in the art will appreciate that the packets may be further routed in multiple ways after reaching one of the ISPs, which creates additional paths (e.g., path 1 (130), path n (135)). In one or more embodiments of the invention, paths (e.g., path 1 (130), path n (135)) in the system refer to disjoint paths, or paths that do not share the same physical connections. In one or more embodiments of the invention, paths (e.g., path 1 (130), path n (135)) that share a physical link between two nodes (e.g., a wire between two routers) are merged to create a single disjoint path.

Those skilled in the art will appreciate that each path (e.g., path 1 (130), path n (135)) is associated with a set of network characteristics, such as bandwidth, packet loss rate, round trip time, etc. For example, a path (e.g., path 1 (130), path n (135)) that includes a wireless connection between two nodes may have a higher packet loss rate than a path that is made using only wired connections. As another example, a path (e.g., path 1 (130), path n (135)) with only wired links may have a faster round-trip time than a path that includes one or more satellite links.

In one or more embodiments of the invention, packet transmission along each path (e.g., path 1 (130), path n (135)) is regulated by a separate transport protocol module (e.g., transport protocol module 1 (110), transport protocol module n (115)). In one or more embodiments of the invention, the transport protocol modules (e.g., transport protocol module 1 (110), transport protocol module n (115)) are associated with the transport layer (143). In one or more embodiments of the invention, each transport protocol module (e.g., transport protocol module 1 (110), transport protocol module n (115)) implements a congestion control algorithm, which is responsible for optimizing packet transmission and avoiding network congestion. On the other hand, a transport protocol module (e.g., transport protocol module 1 (110), transport protocol module n (115)) may not implement a congestion control algorithm.

In one or more embodiments of the invention, a congestion control algorithm is designed to send packets optimally over a particular kind of network (150). In other words, a first congestion control algorithm may work better than a second congestion control algorithm for a given set of network conditions, but the second congestion control algorithm may perform better than the first congestion control algorithm for another set of network conditions. For example, TCP congestion control algorithms include, but are not limited to, Hamilton TCP, TCP Westwood, and FAST TCP. Hamilton TCP is designed to improve the stability of TCP on high bandwidth-delay product (BDP) networks, such as satellite networks. TCP Westwood is designed to support wireless networks. FAST TCP includes a congestion control algorithm targeted at high-speed, long distance links. Other examples of TCP congestion control algorithms include, but are not limited to, TCP Tahoe, TCP Reno, TCP Vegas, TCP NewReno, TCP Hybla, TCP Selective Acknowledgement Options (SACK), HighSpeed TCP (HSTCP), Binary Increase Congestion (BIC) TCP, Cubic BIC (CUBIC) TCP, Scalable TCP (STCP), and Smart Acknowledgement (ACK) Dropper (SAD).

In one or more embodiments of the invention, a congestion control algorithm is selected for each path (e.g., path 1 (130), path n (135)) based on the characteristics of that path. The congestion control algorithm is then implemented in the transport protocol module (e.g., transport protocol module 1 (110), transport protocol module n (115)) associated with that path (e.g., path 1 (130), path n (135)). For example, a path (e.g., path 1 (130), path n (135)) that includes a wireless link may be optimally regulated using TCP Westwood, whereas a path that includes a satellite link may be regulated more optimally using Hamilton TCP. In other words, a congestion control algorithm that best optimizes packet flow along a path (e.g., path 1 (130), path n (135)) is selected for that path.

In one or more embodiments of the invention, the congestion control algorithm associated with a transport protocol module (e.g., transport protocol module 1 (110), transport protocol module n (115)) is responsible for regulating packet transmission and flow along the path (e.g., path 1 (130), path n (135)) for which the transport protocol module is responsible. In one or more embodiments of the invention, each transport protocol module (e.g., transport protocol module 1 (110), transport protocol module n (115)) is associated with a buffer (e.g., buffer 1 (120), buffer n (125)). In one or more embodiments of the invention, a transport protocol module (e.g., transport protocol module 1 (110), transport protocol module n (115)) uses the associated buffer (e.g., buffer 1 (120), buffer n (125)) for packet scheduling based on the congestion control algorithm implemented by that transport protocol module. For example, packets may be placed in a buffer (e.g., buffer 1 (120), buffer n (125)) for sending based on the link speed, failure rate, etc. observed from the corresponding path (e.g., path 1 (130), path n (135)). The packets are then transmitted from that buffer (e.g., buffer 1 (120), buffer n (125)) by the corresponding transport protocol module (e.g., transport protocol module 1 (110), transport protocol module n (115)) using the selected congestion control algorithm. In one or more embodiments of the invention, each buffer (e.g., buffer 1 (120), buffer n (125)) is allocated based on the bandwidth and/or speed of the corresponding path (e.g., path 1 (130), path n (135)). For example, a high-bandwidth, high-speed path (e.g., path 1 (130), path n (135)) may be allocated a larger buffer than a low-bandwidth, low-speed path.

In one or more embodiments of the invention, a mathematical or computational model, such as a Bayesian network, artificial neural network, radial basis function, or other statistical modeling structure, is used to select a congestion control algorithm for each path (e.g., path 1 (130), path n (135)) based on the characteristics of that path. In one or more embodiments of the invention, the congestion control algorithm is selected in a manner described in the patent application owned by the same assignee and filed concurrently with this application, namely patent application Ser. No. 11/639,042 filed on Dec. 14, 2006 entitled "Method and System for Using Bayesian Network Inference for Selection of Transport Protocol Algorithm" with the inventors Cesar A. Marcondes, Darrin P. Johnson, and Anders D. Persson, and hereby incorporated by reference.

As shown in FIG. 1, the system also includes a master transport protocol module (105). In one or more embodiments of the invention, the master transport protocol module (105) assigns congestion control algorithms to transport protocol modules (e.g., transport protocol module 1 (110), transport protocol module n (115)) once the congestion control algorithms have been selected. The master transport protocol module (105) may also assign packets to each path (e.g., path 1 (130), path n (135)) and monitor the performance of each transport protocol module (e.g., transport protocol module 1 (110), transport protocol module n (115)) in regulating packet transmission and flow along the associated path (e.g., path 1 (130), path n (135)). For example, if two paths (e.g., path 1 (130), path n (135)) to the packet destination (140) are available, the master transport protocol module (105) may assign a majority of packets to the path with higher bandwidth, and the rest of the packets to the path with lower bandwidth.

In one or more embodiments of the invention, the master transport protocol module (105) is associated with the transport layer (143). In one or more embodiments of the invention, the master transport protocol module (105) interfaces with the application (100) using the same routines as a standard transport protocol implementation, such as TCP or SCTP. In other words, to the application (100), the master transport protocol module (105) is indistinguishable from a standard transport protocol implementation. Alternatively, the application (100) may be aware of the capabilities of the master transport protocol module (105) and work directly with the master transport protocol module (105) to transmit data optimally to the packet destination (140). In one or more embodiments of the invention, the master transport protocol module (105) is itself selected as a general congestion control algorithm for the network connection (103). The master transport protocol module (105) then implements congestion control for each path using the methods described above.

In one or more embodiments of the invention, the master transport protocol module (105) implements a multihoming mechanism, or virtual circuit. For example, the master transport protocol module (105) may implement SCTP multihoming and/or TCP virtual circuit capabilities. In one or more embodiments of the invention, a multihoming mechanism/virtual circuit allows packets to be transmitted from the application (100) to the packet destination (105) across multiple paths (e.g., path 1 (130), path n (135)). In addition, the packet destination (140) may also implement a multihoming mechanism/virtual circuit using its own master transport protocol module (105) or another compatible multihoming mechanism. If the packet destination (140) includes multihoming capabilities, packets may be transmitted simultaneously across multiple paths (e.g., path 1 (130), path n (135)) from the application (100) to the packet destination (140) to increase bandwidth usage. Simultaneous packet transmission across multiple paths is explained in greater detail in FIG. 3.

In one or more embodiments of the invention, the master transport protocol module (105) regulates one or more aggregated paths (not shown) between the application (100) and packet destination (140). For example, paths (e.g., path 1 (130), path n (135)) from multiple virtual LANs (VLANs) may be aggregated under a single interface. Data from each VLAN may then be transferred from one location to another (e.g., from the application (100) to the packet destination (140)) using the aggregated paths (e.g., path 1 (130), path n (135)). In addition, packets transferred over the aggregated paths (e.g., path 1 (130), path n (135)) may be encoded and/or encrypted by applying an interceding mechanism to the packets on the aggregated paths.

In one or more embodiments of the invention, the system of FIG. 1 may be used to enhance packet transmission reliability. For example, if a VoIP application (100) transfers packets to the packet destination (140) using a forward error correction (FEC) mechanism, two codecs are transmitted simultaneously by the VoIP application (100). The master transport protocol module (105) may transfer one codec using one path (e.g., path 1 (130), path n (135)), and another codec using another path. Those skilled in the art will appreciate that by transmitting the codecs over separate paths (e.g., path 1 (130), path n (135)), the packets will experience less end-to-end delay between the application (100) and packet destination (140), and lost packets may be recovered more easily due to the independence of each codec's transmission. In addition, those skilled in the art will appreciate that the example above may be applied to any error correction mechanism.

In one or more embodiments of the invention, the system of FIG. 1 may also be used to synchronize packet transmission across multiple paths (e.g., path 1 (130), path n (135)). For example, the master transport protocol (105) may estimate packet arrival times on each path (e.g., path 1 (130), path n (135)) and assign packets among the paths based on the estimated arrival times, such that the packets arrive at the packet destination (140) in the order predicted by the master transport protocol (105). In addition, the master transport protocol (105) may provide synchronization information to the packet destination (140) by transmitting timing information on one or more paths (e.g., path 1 (130), path n (135)) to the packet destination along with packet data. The timing information may be transferred on a dedicated path (e.g., path 1 (130), path n (135)), or the timing information may be included in data packets or be transferred on the same paths as the data packets.

Figure 2:
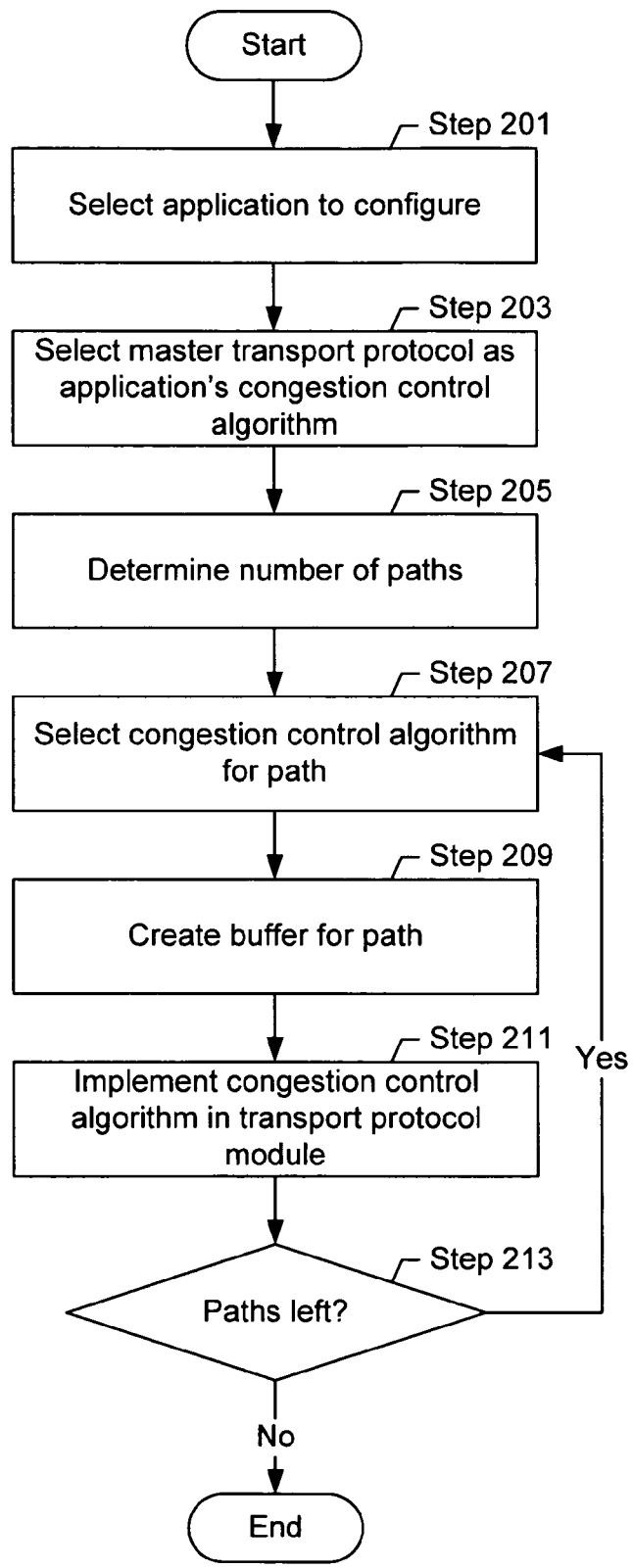
FIGS. 2-3 show flow diagrams in accordance with one or more embodiments of the invention.

FIG. 2 shows a flow diagram of congestion control algorithm selection in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, an application is selected for configuration (Step 201). As mentioned above, the application may correspond to any application, such as an FTP application, VoIP application, streaming media application, web browser, etc. In order to enable congestion control for multiple paths, the master transport protocol module is selected as the congestion control algorithm for the application (Step 203). The number of paths to a particular packet destination is also determined (Step 205). The master transport protocol module may be responsible for determining the number of paths to the packet destination, or the master transport protocol module may receive external information regarding the number of paths to the packet destination. For example, network tomography techniques may be used to estimate the number of paths, both disjoint and shared, between the application and the packet destination, as well as characteristics of each path. In addition, network tomography techniques may be used to estimate the network topology and infrastructure of the underlying network between the application and packet destination.

For each path, a congestion control algorithm is selected (Step 207). As stated above, the congestion control algorithm may be selected based on the characteristics of that path, such as round-trip time, system load, bandwidth, packet loss rate, etc. In addition, a statistical or computational model, such as a Bayesian network, may be used to select the congestion control algorithm for the path. A buffer is also created for the path (Step 209). As mentioned previously, the buffer may also be allocated based on characteristics of the path. For example, a path with higher bandwidth may receive a larger buffer than a path with lower bandwidth.

The congestion control algorithm is implemented in the transport protocol module associated with the path (Step 211). In one or more embodiments of the invention, the congestion control algorithm is "plugged in" to the transport protocol module. For example, a reference or function pointer to the appropriate congestion control algorithm may passed to the transport protocol module; the transport protocol module then uses the reference or function pointer to perform the congestion control algorithm. In addition, the congestion control algorithm may be easily changed for a given transport protocol module if needed. For example, a different congestion control algorithm may be used simply by providing a different function pointer or reference to the transport protocol module.

A determination is then made as to whether any paths are left to configure (Step 213). If additional paths requiring configuration remain, Steps 207-213 are repeated.

Those skilled in the art will appreciate that the master transport protocol module may be selected for the other network connections. As a result, the master transport protocol module may be used with one or more network connections. Further, the steps described in FIG. 2 may be performed prior to establishing a network connection with a packet destination, or the steps may be performed while packets are being transmitted across an existing network connection. For example, the master transport protocol module may be selected as a congestion control algorithm for an FTP transfer after the data has already started transmitting. In such cases, the master transport protocol module may use information collected from the already-transmitted packets to determine the number of paths, characteristics of each path, etc. A congestion control algorithm may also be selected for each path using the collected information. Once a congestion control algorithm is implemented by a transport protocol module, the transport protocol module may begin regulating packet transmission and flow immediately, using the implemented congestion control algorithm.

Figure 3:
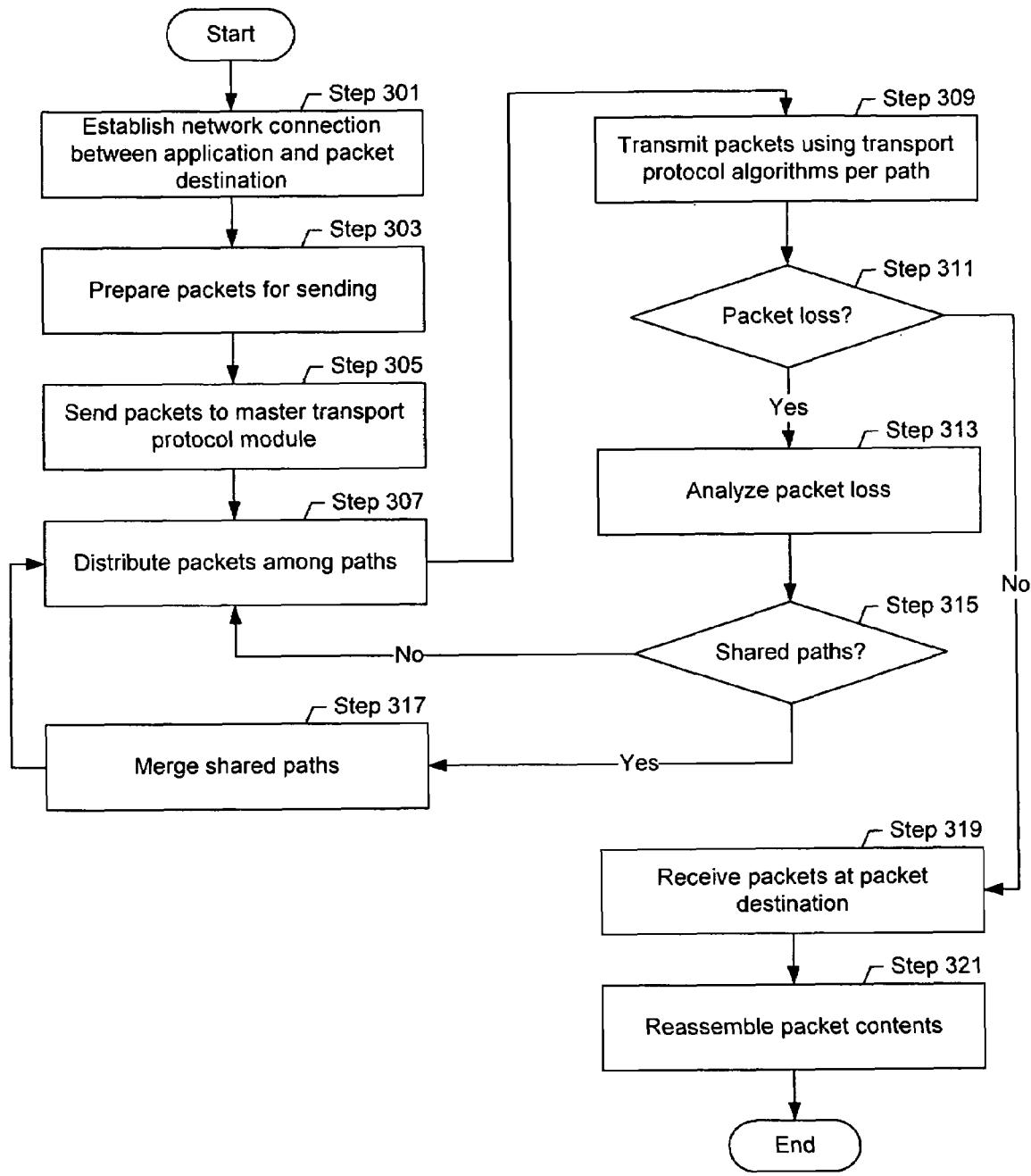

FIG. 3 shows a flow diagram of packet transmission over a network connection in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a network connection between an application and packet destination is established (Step 301). For example, the network connection may be established using a TCP three-way handshake. As mentioned above, the application and packet destination may be connected using multiple paths over multiple networks, such as LANs, WANs, satellite networks, wireless networks, etc.

Packets are prepared for sending (Step 303). In one or more embodiments of the invention, packets are created and prepared based on the type of application, nature of the packet destination, type of data being transmitted, packet size, etc. For example, data from the application to the packet destination may be formatted for transfer, encrypted, authenticated, etc. Packets may be prepared by the application itself, or by an associated protocol, such as FTP, HyperText Transfer Protocol (HTTP), etc.

The packets are then sent to the master transport protocol module (Step 305). Based on information obtained about each path, the master transport protocol module distributes the packets, as necessary, among the paths (Step 307). For example, the packets may be distributed based on bandwidth, round trip time, packet loss rate, etc., for each path. In one or more embodiments of the invention, a statistical or computational model, such as a Bayesian network, artificial neural network, radial basis function, etc., may be used to distribute the packets among the paths. The packets may also be distributed among the paths based on a predetermined order of transmission. For example, if multihoming is enabled in the packet destination, the packets may be ordered and distributed in accordance with the multihoming mechanism between the application and packet destination such that the packet contents are reassembled correctly at the packet destination, even if the packets are sent simultaneously through multiple paths.

The packets are received by the appropriate transport protocol module and transmitted using the congestion control algorithm implemented by that transport protocol module (Step 309). For example, a congestion control algorithm may begin transmitting the packets at a certain rate, then alter the rate based on feedback from routers along the path or from the packet destination itself. However, additional management may be needed based on the possibility of packet loss (Step 311). If a packet loss is detected, the packet loss is analyzed (Step 313). For example, if a packet loss is detected by a router, the router sends notification to the application of the packet loss so that the lost packet(s) may be retransmitted by the application. In one or more embodiments of the invention, the packet loss is analyzed and handled by the congestion control algorithm present in the transport protocol module of the path that experienced the packet loss.

Based on the analysis of the packet loss, a determination is made regarding a shared path among two or more paths (Step 315). In one or more embodiments of the invention, a shared path occurs if two or more paths share a common link. For example, if two paths use the same physical link between two routers, the paths are shared paths. Alternatively, two paths may be considered shared if they share the same node. In other words, if two paths share one router, the paths are shared paths. In one or more embodiments of the invention, a shared path between two paths is detected when packet losses are observed through a common point on both paths. In one or more embodiments of the invention, network tomography techniques are used to detect packet losses along each path, as well as determine shared paths among two or more paths.

If a shared path is found between two or more paths, the paths are merged (Step 317). In one or more embodiments of the invention, the paths are merged to improve fair utilization of network resources. For example, if the application is given a certain amount of bandwidth on a physical link between two routers, sending packets along two paths that share that physical link effectively doubles the bandwidth the application uses on that physical link. As a result, the paths are merged to fairly use the bandwidth allocated to the application. In other words, a single path is created from the two paths and bandwidth is allocated to the single path based on the limitations of each of the physical links of that path. Alternatively, the shared paths may be preserved and the bandwidth halved for each path to implement fair use of the shared physical link. Once the shared paths are handled, packets are redistributed among the paths (Step 307) and transmitted by each path (Step 309).

If a shared path is not found, packets are redistributed based on the analysis of the packet loss (Step 307), and packet transmission also continues (Step 309). Optionally, a new congestion control algorithm may be selected for the path experiencing the packet loss, using Bayesian network inference, for example. As described above, the new congestion control algorithm may then be "plugged in" to the transport protocol module of the path and used immediately to improve packet transmission along the path.

If a packet loss is not found, the packets are received by the packet destination (Step 319). As mentioned above, the packets may be received out of order by the packet destination. The packet destination may then use a multihoming/virtual network mechanism for reassembling the packet contents (Step 321). Alternatively, if no multihoming is used, the packet destination receives the packets in order and reassembles them using one or more protocols, such as TCP, UDP, etc. The packet destination may also send notice of any missing packets and request retransmission of those packets from the application. In one embodiment of the invention, Steps 309-317 are optional.

Figure 4:
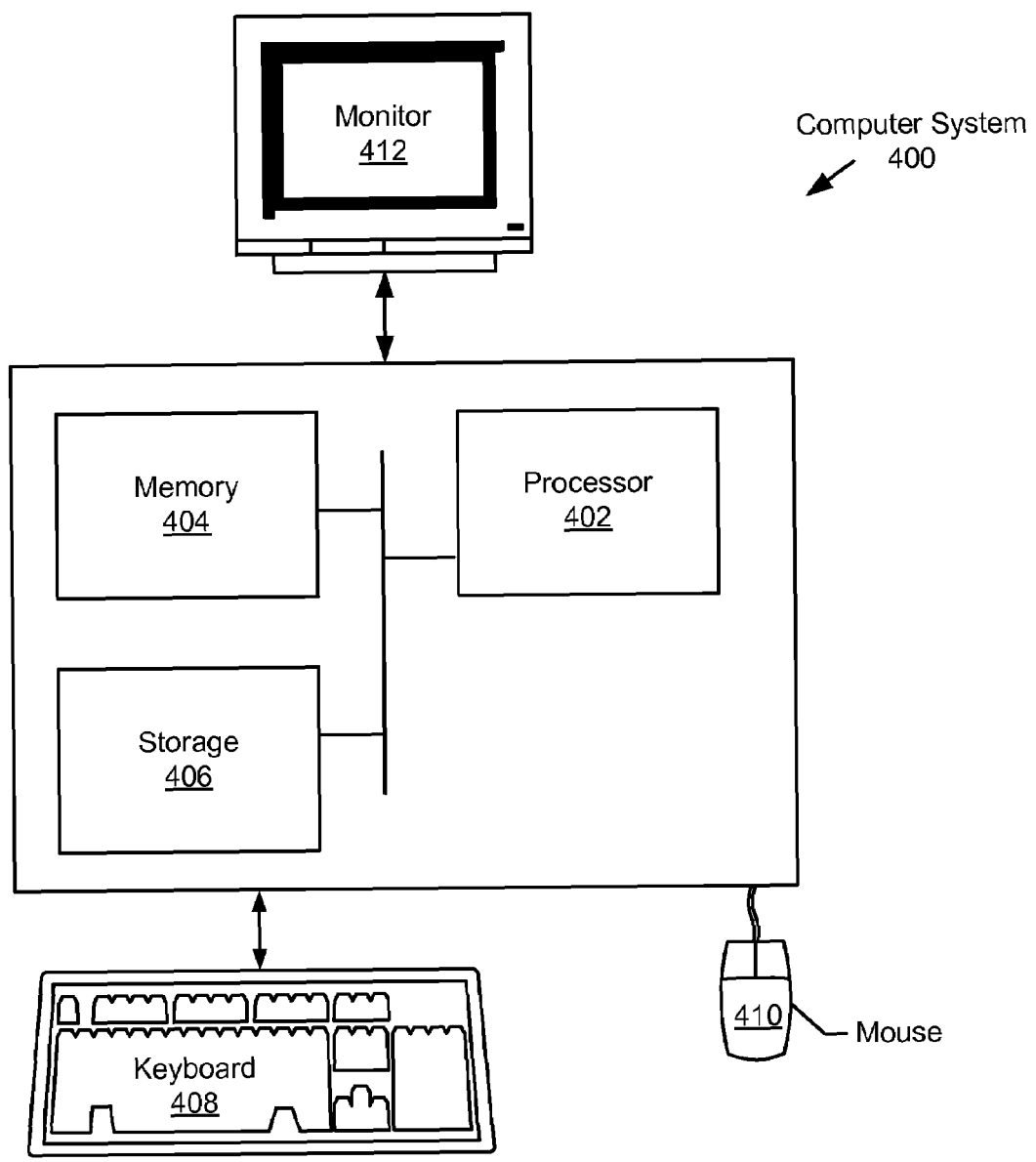
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., application, master transport protocol module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a network connection, comprising:
    establishing the network connection between an application and a packet destination, wherein the network connection comprises a plurality of paths;
    receiving a plurality of packets from the application on the network connection, wherein the plurality of packets is associated with the network connection, and wherein the plurality of packets comprises data from the application;
    obtaining a distribution of the plurality of packets among the plurality of paths by a master transport protocol module, wherein each of the plurality of paths is associated with one of a plurality of transport protocol modules;
    transmitting, based on the distribution, the plurality of packets over the plurality of paths using the plurality of transport protocol modules;
    receiving a packet loss associated with the plurality of packets;
    analyzing the network connection based on the packet loss;
    detecting a shared path between at least two of the plurality of paths using the analysis; and
    merging the at least two of the plurality of paths,
    wherein each of the plurality of transport protocol modules implements one of a plurality of congestion control algorithms,
    wherein the plurality of packets are received and reassembled at the packet destination.

2. The method of claim 1, further comprising:
    redistributing the plurality of packets among the plurality of paths based on the analysis.

3. The method of claim 1, further comprising:
    selecting a new congestion control algorithm for one of the plurality of paths associated with the packet loss; and
    implementing the new congestion control algorithm on one of the plurality of transport protocol modules associated with the one of the plurality of paths.

4. The method of claim 1, wherein the plurality of transport protocol modules is regulated by the master transport protocol module.

5. The method of claim 1, wherein the master transport protocol module is selected as a congestion control algorithm for the network connection.

6. The method of claim 1, wherein each of the plurality of transport protocol modules is selected based on a characteristic of one of the plurality of paths.

7. The method of claim 1, wherein each of the plurality of transport protocol modules is one selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), High-Speed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), and User Datagram Protocol (UDP).

8. A system, comprising:
    an application configured to transmit a plurality of packets, wherein the plurality of packets comprises data from the application;
    a plurality of transport protocol modules, wherein each of the plurality of transport protocol modules implements one of a plurality of congestion control algorithms; and
    a master transport protocol module configured to manage a network connection, wherein the network connection comprises a plurality of paths,
    wherein the system is configured to:
        establish a network connection between the application and a packet destination, wherein the network connection comprises the plurality of paths;
        receive the plurality of packets from the application on the network connection, wherein the plurality of packets is associated with the network connection;
        obtaining a distribution of the plurality of packets among the plurality of paths by the master transport protocol module, wherein each of the plurality of paths is associated with one of the plurality of transport protocol modules;
        transmitting, based on the distribution, the plurality of packets over the plurality of paths using the plurality of transport protocol modules, wherein the plurality of packets are received and reassembled at the packet destination;
        receive by the master transport protocol module, a packet loss associated with the plurality of packets;
        analyze, by the master transport protocol module, the packet loss
        detect, from the analysis, a shared path; and merge at least two of the plurality of paths associated with the shared path.

9. The system of claim 8, further comprising:
a plurality of buffers, wherein each of the plurality of buffers is associated with one of the plurality of paths.

10. The system of claim 8, wherein each of the plurality of transport protocol modules is one selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), High-Speed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), and User Datagram Protocol (UDP).

11. The system of claim 8, wherein the plurality of packets is redistributed among the plurality of paths based on the analysis.

12. The system of claim 8, wherein a new congestion control algorithm from the plurality of congestion control algorithms is selected for one of the plurality of paths associated with the packet loss based on the analysis, and wherein the new congestion control algorithm is implemented on one of the plurality of transport protocol modules associated with the one of the plurality of paths.

13. The system of claim 8, wherein the master transport protocol module is selected as a transport protocol module for the network connection.

14. The system of claim 8, wherein each of the plurality of congestion control algorithms is selected based on a characteristic of one of the plurality of paths.

15. A non-transitory computer readable medium containing software instructions for executing a method for managing a network connection, the method comprising:
establishing the network connection between an application and a packet destination, wherein the network connection comprises a plurality of paths;
receiving a plurality of packets from the application on the network connection, wherein the plurality of packets is associated with the network connection, and wherein the plurality of packets comprises data from the application;
obtaining a distribution of the plurality of packets among the plurality of paths by a master transport protocol module, wherein each of the plurality of paths is associated with one of a plurality of transport protocol modules;
transmitting, based on the distribution, the plurality of packets over the plurality of paths using the plurality of transport protocol modules;
receiving a packet loss associated with the plurality of packets;
analyzing the network connection based on the packet loss;
detecting a shared path between at least two of the plurality of paths using the analysis; and
merging the at least two of the plurality of paths,
wherein each of the plurality of transport protocol modules implements one of a plurality of congestion control algorithms, wherein the plurality of packets are received and reassembled at the packet destination.

16. The non-transitory computer readable medium of claim 15, wherein the plurality of transport protocol modules is regulated by the master transport protocol module.

* * * * *

UNITED STATES PATENT AND TRADEMARK OFFICE
CERTIFICATE OF CORRECTION

PATENT NO. : 7,701,856 B2
APPLICATION NO. : 11/638904
DATED : April 20, 2010
INVENTOR(S) : Cesar A. C. Marcondes et al.

It is certified that error appears in the above-identified patent and that said Letters Patent is hereby corrected as shown below:

In column 7, line 58, delete "interceding" and insert -- intercoding --, therefor.

In column 12, line 30, in claim 7, delete "High-Speed" and insert -- HighSpeed --, therefor.

In column 13, line 12, in claim 10, delete "High-Speed" and insert -- HighSpeed --, therefor.

Signed and Sealed this
Twelfth Day of April, 2011

David J. Kappos
*Director of the United States Patent and Trademark Office*